United States Patent
Carlson et al.

(10) Patent No.: US 9,616,906 B2
(45) Date of Patent: Apr. 11, 2017

(54) HAND TRUCK OUTRIGGER

(75) Inventors: Paul Carlson, North Bend, OR (US); Donna Carlson, North Bend, OR (US)

(73) Assignee: NIA, North Bend, OR (US)

( * ) Notice: Subject to any disclaimer, the term of this patent is extended or adjusted under 35 U.S.C. 154(b) by 0 days.

(21) Appl. No.: 13/474,557

(22) Filed: May 17, 2012

(65) Prior Publication Data

US 2012/0299259 A1    Nov. 29, 2012

Related U.S. Application Data

(60) Provisional application No. 61/488,827, filed on May 23, 2011.

(51) Int. Cl.
  *B62B 1/00*  (2006.01)
  *B62B 1/12*  (2006.01)
  *B62B 1/14*  (2006.01)
  *B62B 1/26*  (2006.01)

(52) U.S. Cl.
  CPC .............. *B62B 1/12* (2013.01); *B62B 1/14* (2013.01); *B62B 1/26* (2013.01); *B62B 2202/30* (2013.01)

(58) Field of Classification Search
  CPC ............... B62B 1/10; B62B 1/12; B62B 1/14
  USPC ......... 280/47.28, 43.1, 43.14, 47.131, 47.17, 280/47.19, 47.23, 47.27, 47.29, 47.34, 280/405.1; 224/401, 484, 545, 546, 547; 248/98, 129; 312/244; 414/607; 410/46, 410/96, 97; 108/51.11, 57.1, 57.26; 24/298, 299, 302
  See application file for complete search history.

(56) References Cited

U.S. PATENT DOCUMENTS

| | | | | |
|---|---|---|---|---|
| 1,734,778 A | * | 11/1929 | Pribil | B62B 1/147 280/47.27 |
| 2,778,515 A | * | 1/1957 | Hanson | B62B 1/14 248/229.11 |
| 2,838,190 A | * | 6/1958 | Stevens | B62B 1/14 242/384.7 |
| 3,034,673 A | * | 5/1962 | Schulz | B62B 1/12 414/457 |
| 3,046,035 A | * | 7/1962 | Nichols | B62B 1/10 280/47.27 |
| 3,155,256 A | * | 11/1964 | Cook | B62B 1/14 280/47.27 |
| 3,870,177 A | * | 3/1975 | Cobb | B62B 1/14 414/446 |
| 3,876,096 A | * | 4/1975 | Latek | B62B 5/0089 254/114 |

(Continued)

*Primary Examiner* — Brodie Follman
(74) *Attorney, Agent, or Firm* — Thien Tran; Access Patent Group, LLC

(57) ABSTRACT

An extender accessory for a hand truck having a frame with two vertical frame portions, a plurality of cross bars connected between the frame portions, a pair of axle mounted wheels at lower ends of the frame portions and a platform extending forwardly from the lower ends of the frame portions. The extender accessory comprises an L-shaped support member being of a length longer than the width of the platform. A mechanism is for removably attaching the L-shaped support member against the lower ends of the frame portions and sit upon the platform. The L-shaped support member will overhang opposite sides of the platform, to allow the L-shaped support member to carry and stabilize a variety of loads placed thereon.

14 Claims, 2 Drawing Sheets

(56) References Cited

U.S. PATENT DOCUMENTS

| | | | | |
|---|---|---|---|---|
| 3,927,898 A | * | 12/1975 | Weyrauch | B62B 1/12 280/47.27 |
| 4,307,892 A | * | 12/1981 | Miles | B62B 13/18 280/9 |
| 4,362,458 A | * | 12/1982 | Jantzi | B62B 5/0083 254/2 R |
| 4,504,071 A | * | 3/1985 | Drummond | B62B 5/025 280/47.27 |
| 4,563,014 A | * | 1/1986 | Mortenson | B62B 1/12 280/47.18 |
| 4,614,349 A | * | 9/1986 | Wenzel | B62B 1/12 280/43.1 |
| 4,726,602 A | * | 2/1988 | Sanders | B62B 1/12 211/181.1 |
| 5,215,427 A | * | 6/1993 | Olsthoorn | B66F 9/12 414/623 |
| 5,393,081 A | * | 2/1995 | Mortenson | B60T 11/046 188/22 |
| 5,465,987 A | * | 11/1995 | DellaVecchia | B62B 1/14 280/47.18 |
| 5,518,356 A | * | 5/1996 | Krawczyk | B62B 1/14 280/47.18 |
| 5,603,591 A | * | 2/1997 | McLellan | B60P 7/0823 224/318 |
| 5,669,659 A | * | 9/1997 | Dittmer | A47C 13/00 280/30 |
| 5,871,220 A | * | 2/1999 | Lombard | A61G 1/04 128/870 |
| 5,947,492 A | * | 9/1999 | Hallberg, Jr. | B62B 1/002 248/98 |
| 6,059,515 A | * | 5/2000 | Keller | A01F 25/2036 280/47.131 |
| 6,082,755 A | * | 7/2000 | Topar | B60D 1/00 280/416.1 |
| D440,372 S | * | 4/2001 | Williams | B60D 1/00 D34/27 |
| 6,250,655 B1 | * | 6/2001 | Sheeks | B62B 1/268 280/47.18 |
| 6,341,789 B1 | * | 1/2002 | Checa | B62B 1/264 280/47.28 |
| 6,357,063 B1 | * | 3/2002 | Selby | A61G 5/00 280/47.131 |
| 6,447,002 B1 | * | 9/2002 | Fang | A45C 13/385 280/47.29 |
| 6,481,727 B1 | * | 11/2002 | Stallbaumer | B62B 1/10 280/47.24 |
| 6,709,222 B2 | * | 3/2004 | Inman, Jr. | B62B 1/12 280/47.18 |
| D492,829 S | * | 7/2004 | Babkes | B60D 1/00 D34/24 |
| 6,893,029 B2 | * | 5/2005 | Hailston | B62B 1/10 280/47.27 |
| 6,991,241 B1 | * | 1/2006 | Ostrow | B62B 1/12 280/30 |
| 7,628,406 B1 | * | 12/2009 | Thomas | B62B 1/14 280/47.18 |
| 7,823,893 B2 | * | 11/2010 | Meyers | B62B 1/12 280/47.18 |
| 7,914,017 B2 | * | 3/2011 | Setzer, Sr. | B62B 1/10 280/47.17 |
| 7,946,598 B1 | * | 5/2011 | Malone, Jr. | B62B 1/002 280/47.18 |
| 8,087,679 B1 | | 1/2012 | Salvucci, Jr. | |
| 8,152,180 B2 | * | 4/2012 | Anspach | B62B 1/12 280/47.27 |
| 8,459,515 B1 | * | 6/2013 | Weis | B62B 1/002 224/401 |
| 2002/0030351 A1 | * | 3/2002 | Gillette | B62B 1/12 280/652 |
| 2002/0040918 A1 | * | 4/2002 | Pierce | B60R 11/06 224/567 |
| 2003/0075887 A1 | * | 4/2003 | Malone, Jr. | B62B 1/002 280/30 |
| 2003/0201615 A1 | * | 10/2003 | Grooters | B62B 1/125 280/47.27 |
| 2004/0028512 A1 | * | 2/2004 | Inman, Jr. | B62B 1/12 414/490 |
| 2004/0094496 A1 | * | 5/2004 | MacDonald | A47B 91/00 211/189 |
| 2006/0006618 A1 | * | 1/2006 | Duncan | A45C 13/385 280/47.26 |
| 2006/0120277 A1 | * | 6/2006 | Katz | B62B 1/10 370/216 |
| 2006/0182566 A1 | * | 8/2006 | Russo | B62B 1/14 414/444 |
| 2007/0056797 A1 | * | 3/2007 | Wang | B62B 1/12 182/21 |
| 2007/0084894 A1 | * | 4/2007 | Burns | B62B 5/00 224/572 |
| 2008/0203688 A1 | * | 8/2008 | Meyers | B62B 1/12 280/47.29 |
| 2008/0224433 A1 | * | 9/2008 | Setzer | B62B 1/10 280/47.131 |
| 2009/0026735 A1 | | 1/2009 | Watzke | |
| 2009/0250889 A1 | | 10/2009 | Palmore | |
| 2011/0266761 A1 | * | 11/2011 | Anspach | B62B 1/12 280/47.27 |
| 2011/0276181 A1 | * | 11/2011 | Lamb | B62B 1/14 700/275 |
| 2012/0098218 A1 | * | 4/2012 | Richard | B62B 5/0485 280/47.24 |
| 2012/0126501 A1 | * | 5/2012 | Meyers | B62B 1/002 280/47.18 |
| 2012/0139201 A1 | * | 6/2012 | Chauza | B62B 1/16 280/47.19 |
| 2012/0153587 A1 | * | 6/2012 | Ryan | B62B 1/12 280/47.27 |
| 2012/0153710 A1 | * | 6/2012 | Ryan | B62B 1/12 301/111.01 |

* cited by examiner

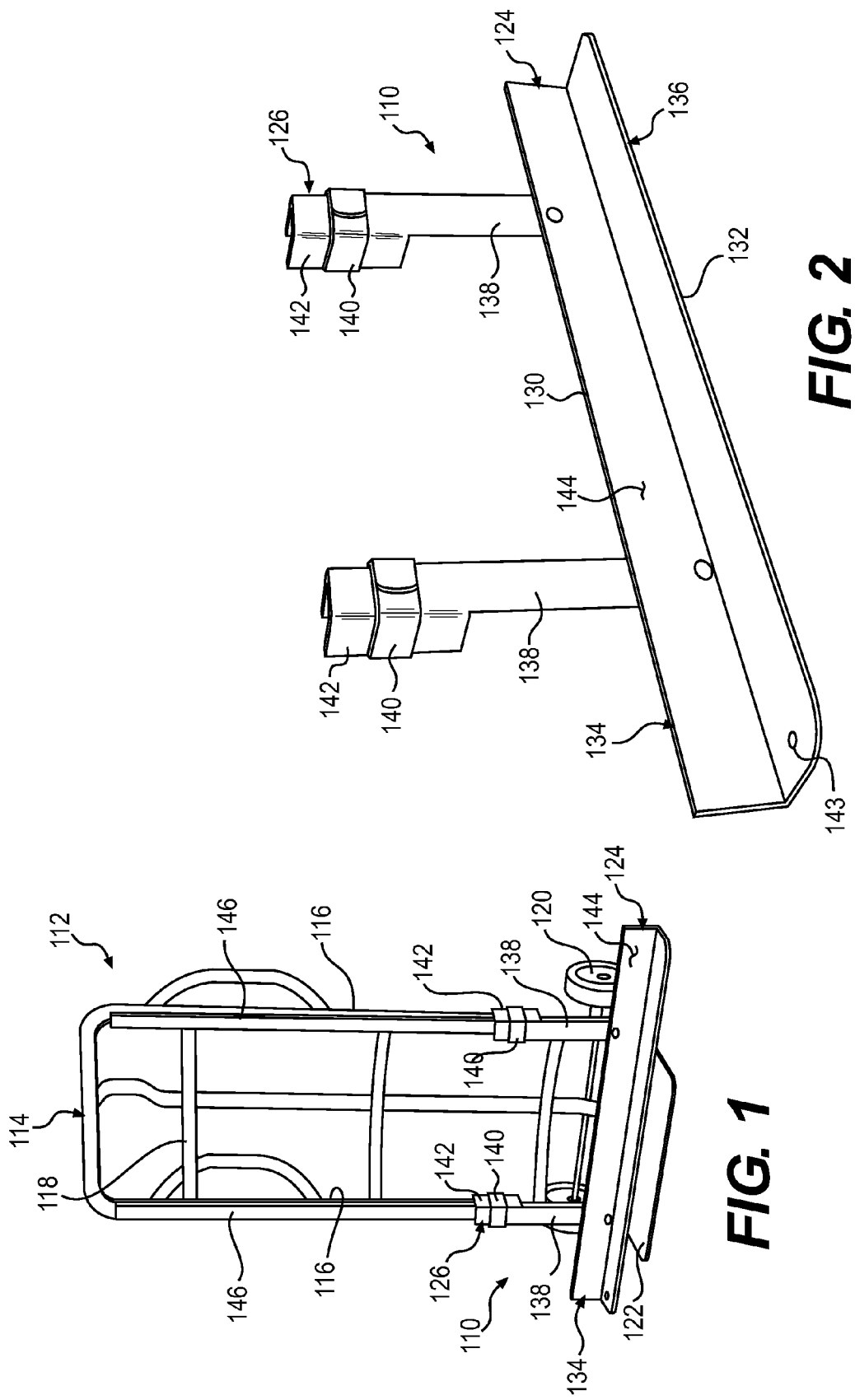

HAND TRUCK OUTRIGGER

CROSS-REFERENCE TO RELATED APPLICATION

This application claims the benefit of Provisional Patent Application No. 61/488,827, filed on May 23, 2011, in the United States Patent & Trademark Office, the disclosure of which is incorporated herein by reference.

BACKGROUND OF THE INVENTION

Field of the Invention

The present invention relates to a hand truck attachment, and more particularly, an extender accessory for a hand truck.

There are many different scenarios and professions that require individuals to move large, cumbersome objects. Typically individuals employ the use of hand trucks for transporting items like chairs, desks, filing cabinets, and the like. Often times the individuals are forced to locate several different types of hand trucks in order to move a variety of items. This is time consuming and inconvenient. The process can also be straining on the back and neck. A more efficient option is needed.

The present invention is an extender accessory for a hand truck designed to assist in carrying and stabilizing a variety of loads. The extender accessory is ideal for transporting stackable chairs, student desks, narrow utility tables, appliances, and other uniquely shaped items. The present invention can be used by anyone that has a hand truck, such as furniture movers, department stores, warehouses, restaurants, homeowners, and the like. The extender accessory is designed to be placed onto existing types of hand trucks, such as appliance hand trucks, chair hand trucks, student desk hand trucks and the like, which tend to be limited in their uses. Consumers will appreciate the convenience and efficiency that the present invention affords.

Description of the Prior Art

Numerous innovations for hand trucks have been provided in the prior art that will be described. Even though these innovations may be suitable for the specific individual purposes to which they address, however, they differ from the present invention.

A FIRST EXAMPLE, U.S. Pat. No. 4,614,349, Issued on Sep. 30, 1986, to Wenzel teaches a combination hand truck and tool for use in installing floor coverings of the glued-down type, such as carpet or linoleum utilizes the weight of the installer's tool box for pressing the floor covering to the floor, in lieu of a weighted roller ordinarily carried by the installer. Retractable wheels and a pivotable, adjustable position handle enable the device to be used as either a press, riding on glides that contact the floor covering, or as a hand truck for carrying the installer's tools and supplies.

A SECOND EXAMPLE, U.S. Patent Office Publication No. 2003/0201615, Published on Oct. 30, 2003, to Grooters et al. teaches a hand truck comprising a frame including a first frame portion and a second frame portion, with the first frame portion being substantially perpendicular to the second frame portion. The hand truck further includes at least two first wheels connected to a lower section of the frame, with the at least two first wheels having parallel first axes of rotation. The hand truck also includes at least two second wheels connected to the lower section of the frame, with the at least two second wheels having parallel second axes of rotation. The first axes of rotation are substantially perpendicular to the second axes of rotation, whereby the item placed on the first frame portion can be moved in a first direction along a first line parallel to the second axes of rotation and a second direction along a second line parallel to the first axes of rotation.

A THIRD EXAMPLE, U.S. Patent Office Publication No. 2009/0026735, Published on Jan. 29, 2009, to Watzke teaches an apparatus and method for transporting oversized objects, particularly substantially flat or planar objects. In certain embodiments the object is a material in sheet form, such as a wood sheet, metal sheet, dry wall, and the like, or a narrow object such as bed mattresses, tabletops, mirrors and plate glass, doors and the like. Preferably the object is capable of being transported by a single person. In certain embodiments the apparatus is structured to be capable of transporting a mattress through an open doorway without unloading the object.

A FOURTH EXAMPLE, U.S. Patent Office Publication No. 2009/0250889, Published on Oct. 8, 2009, to Palmore teaches a hand truck that is used for moving large objects. The hand truck includes a frame that has a pair of rails and several cross members that extend between the rails. A bracket is mounted to the frame and a first set of wheels are coupled to the frame. A second set of wheels are coupled to the bracket. Several primary handles are mounted to the frame. A first and a second lifting handle are pivotally coupled to the frame.

A FIFTH EXAMPLE, U.S. Pat. No. 8,087,679, Issued on Jan. 3, 2012, to Salvucci, Jr. teaches a handcart which has various embodiments, each embodiment having a pair of larger wheels at the back of the load-carrying platform and a rear axle located above the plane of at least the forward portion of the platform. Smaller caster wheels are mounted on arms extending forward and outward from the forward corners of the platform. The outward ends of the arms are displaced upwardly to place the platform bottom only very slightly higher than the bottoms of the forward casters, thus increasing stability by lowering the center of gravity of the cart and contents, and facilitating loading and unloading of the cart due to the very low platform. The cart need not be tilted rearward to lift the platform from the floor, but may be pushed over the underlying surface with the load-carrying platform remaining level and with all four wheels rolling over the underlying surface.

It is apparent now that numerous innovations for hand trucks have been provided in the prior art that are adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide an extender accessory for a hand truck that avoids the disadvantages of the prior art.

ANOTHER OBJECT of the present invention is to provide an extender accessory for a hand truck that is simple and inexpensive to manufacture.

STILL ANOTHER OBJECT of the present invention is to provide an extender accessory for a hand truck that is simple to use.

BRIEFLY STATED, STILL YET ANOTHER OBJECT of the present invention is to provide an extender accessory for a hand truck having a frame with two vertical frame portions, a plurality of cross bars connected between the frame portions, a pair of axle mounted wheels at lower ends of the frame portions and a platform extending forwardly from the lower ends of the frame portions. The extender accessory comprises an L-shaped support member being of a length longer than the width of the platform. A mechanism is for removably attaching the L-shaped support member against the lower ends of the frame portions and sit upon the platform. The L-shaped support member will overhang opposite sides of the platform, to allow the L-shaped support member to carry and stabilize a variety of loads placed thereon.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 1 is a perspective view showing the present invention installed on a hand truck;

FIG. 2 is an enlarged perspective view of the present invention ready for use;

Figure 3:
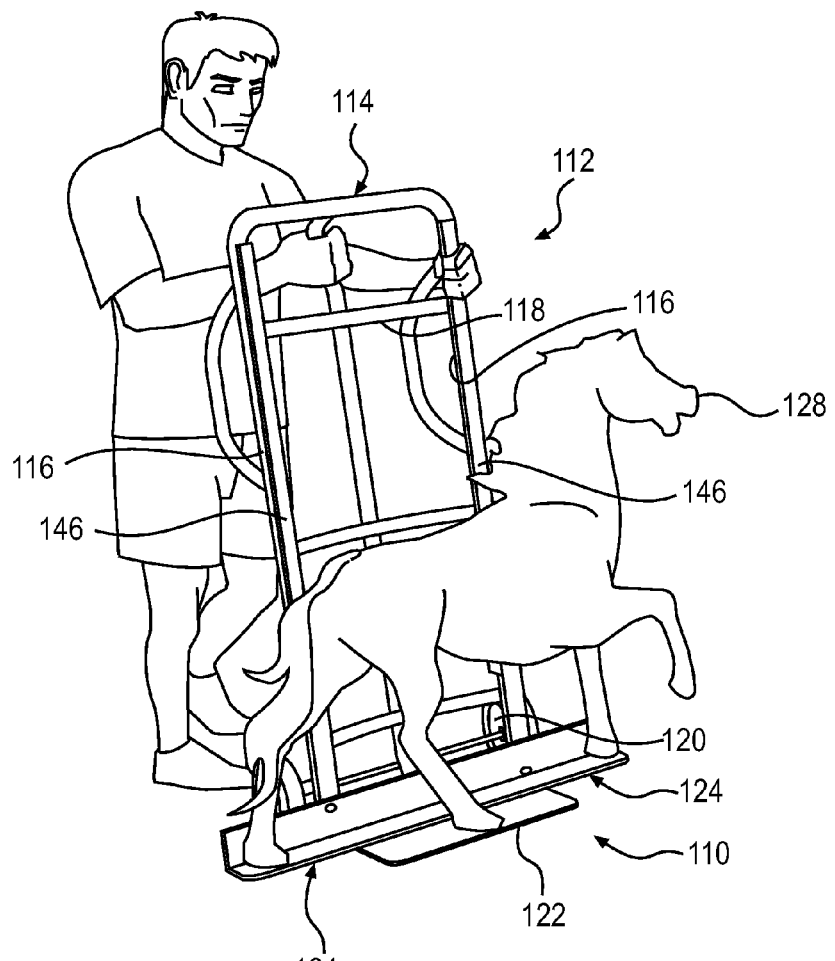
FIG. 3 is a perspective view showing the present invention installed on the hand truck carrying a load placed thereon.

REFERENCE NUMERALS UTILIZED IN THE DRAWING 110 extender accessory
112 hand truck
114 frame of hand truck 112
116 frame portion of frame 114
118 crossbar of hand truck 112
120 axle mounted wheels of hand truck 112
122 platform of hand truck 112
124 L-shaped support member of extender accessory 110
126 removably attaching mechanism of extender accessory 110
128 load
130 first flat leg portion of L-shaped support member 124
132 second flat leg portion of L-shaped support member 124
134 angle iron for L-shaped support member 124
136 aluminum of L-shaped support member 124
138 metal strapping of removably attaching mechanism 126
140 nylon strap of removably attaching mechanism 126
142 channel iron of removably attaching mechanism 126
143 mounting hole in second flat leg portion 132
144 piece of felt of extender accessory 110
146 elongated adhesive felt strip of extender accessory 110

DETAILED DESCRIPTION OF THE PREFERRED EMBODIMENT

As shown in FIG. 1: the present invention is an extender accessory 110 for a hand truck 112 having a frame 114 with two vertical frame portions 116, a plurality of crossbars 118 connected between the frame portions 116, a pair of axle mounted wheels 120 at lower ends of the frame portions 116 and a platform 112 extending forwardly from the lower ends of the frame portions 116.

As shown in FIG. 2: The extender accessory 110 comprises an L-shaped support member 124 being of a length longer than the width of the platform 122. A mechanism 126 is for removably attaching the L-shaped support member 124 against the lower ends of the frame portions 116 and sit upon the platform 122. The L-shaped support member 124 will overhang opposite sides of the platform 122, to allow the L-shaped support member 124 to carry and stabilize a variety of loads 128 placed thereon. The removably attaching mechanism 126 consists of a pair of metal strappings 138. Each metal strapping 138 is pivotally mounted at a front lower end to a rear surface of the first flat leg portion 130 of the L-shaped support member 124, whereby the metal strappings 138 are in a spaced apart relationship and can be pivoted from a horizontal stored position to a vertical position.

Each channel iron 142 is comprised of a size of approximately one and a half inches in width, three quarters of an inch in depth, four inches in length and an eighth of an inch in thickness. The piece of felt 144 is of a size of approximately six inches in width and twenty six inches in length. Each elongated adhesive felt strip 146 is comprised of a size of approximately one inch in width and four feet in length. The spaced apart relationship of each metal strapping 138 is of a size of approximately seven inches from center of the first flat leg portion 130 of the L-shaped support member 124.

As shown in FIG. 3: The L-shaped support member 124 is comprised of a first flat leg portion 130. A second flat leg portion 132 extends at a right angle from the first flat leg portion 130. The L-shaped support member 124 can be an angle iron 134. The L-shaped support member 124 can also be made out of aluminum 136.

Figure 4:
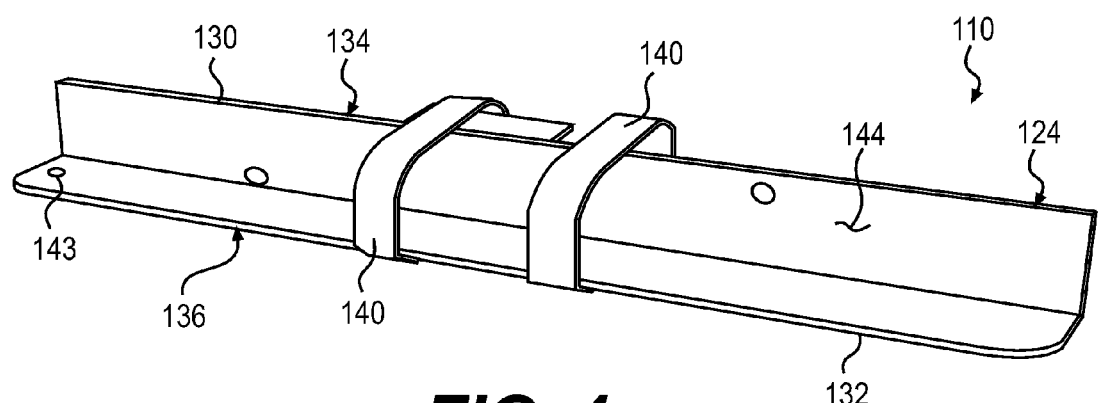
FIG. 4 is an enlarged perspective view of the present invention in a stored position.

As shown in FIG. 4: a pair of nylon straps 140 are provided with each having hook and loop fasteners (not shown) sewn onto opposite sides. A pair of channel irons 142 is also provided. Each channel iron 142 is affixed at a front surface between one end of one nylon strap 140 and a rear upper end of one metal strapping 138. The channel irons 142 can slip over and be placed against the lower ends of the frame portions 116 of the frame 114 of the hand truck 112, to allow the nylon straps 140 to wrap about the upper ends of the metal strappings 138 and the channel irons 142 to be secured to the frame portions 116 of the frame 114 of the hand truck 112 by the hook and loop fasteners.

The second flat leg portion 132 of the L-shaped support member 124 further has a mounting hole 143 near one end to hang on a wall when placed in a stored position. A piece of felt 144 having an adhesive rear surface is sized to fit upon a front surface of the first flat leg portion 130 and the second flat leg portion 132 of the L-shaped support member 124 to provide a cushioning for the load 128 (e.g. a horse statue, . . . et . . . ) placed upon the L-shaped support member 124. The extender accessory 110 can further comprise a pair of elongated adhesive felt strips 146 to engage with front sides of the frame portions 116 of the frame 114 of the hand truck 112 to provide additional cushioning for the load 128 placed upon the L-shaped support member 124.

The L-shaped support member 124 further comprises the first flat leg portion 130 being approximately three inches in width, an eighth of an inch in thickness and twenty six inches in length. The second flat leg portion 132 being approximately three inches in width, an eighth of an inch in thickness and twenty six inches in length. Each metal strapping 138 is comprised of a size of approximately twelve inches in length, one and a half inches in width and a eighth of an inch in thickness. Each nylon strap 140 consists of a size of approximately ten inches in length and one inch in width.

It will be understood that each of the elements described above, or two or more together, may also find a useful application in other types of constructions differing from the types described above.

While the invention has been illustrated and described as embodiments of an extender accessory for a hand truck, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An extender accessory for a hand truck having a frame with two vertical frame portions, a plurality of crossbars connected between the frame portions, a pair of wheels mounted to an axle at lower ends of the frame portions and a platform extending forwardly from the lower ends of the frame portions, the extender accessory comprising:
    a) an L-shaped support member being of a length longer than the width of the platform; and
    b) means for removably attaching the L-shaped support member against the lower ends of the frame portions and sitting upon the platform, whereby the L-shaped support member will overhang opposite sides of the platform, to allow the L-shaped support member to carry and stabilize a variety of loads placed thereon, and wherein the removably attaching means further comprises:
    c) a pair of metal strappings, in which each metal strapping is pivotally mounted at a front lower end thereof to a rear surface of the first flat leg portion of the L-shaped support member, whereby the metal strappings are in a spaced apart relationship and can be pivoted from a horizontal stored position to a vertical position;
    d) a pair of nylon straps each having hook and loop fasteners sewn onto opposite sides; and whereby each nylon strap will wrap about the upper end of one metal strapping with its respective channel shaped sleeve and can be secured to one frame portion of the frame of the hand truck;
    e) a air of channel irons, in which each channel iron is affixed at a front surface thereof between one end of one nylon strap and a rear upper end of one metal strapping, whereby the channel irons can be positioned to slip over and be placed against the lower ends of the frame portions of the frame of the hand truck to allow the nylon straps to wrap about the upper ends of the metal strappings and the channel irons to be secured to the frame portions of the frame of the hand truck by the hook and loop fasteners.

2. The extender accessory as recited in claim 1, wherein the L-shaped support member comprises:
    a) a first flat leg portion; and
    b) a second flat leg portion extending at a right angle from the first flat leg portion.

3. The extender accessory as recited in claim 1, wherein the L-shaped support member is comprised out of an angle iron.

4. The extender accessory as recited in claim 1, wherein the L-shaped support member is comprised out of aluminum.

5. The extender accessory as recited in claim 2, wherein the second flat leg portion of the L-shaped support member further having a mounting hole near one end to hang on a wall when placed in a stored position.

6. The extender accessory as recited in claim 2, further comprising a piece of felt having an adhesive rear surface, being sized to fit upon a front surface of the first flat leg portion and the second flat leg portion of the L-shaped support member to provide a cushioning for the load placed upon the L-shaped support member.

7. The extender accessory as recited in claim 1, further comprising a pair of elongated adhesive strips of felt to engage with front sides of the frame portions of the frame of the hand truck to provide additional cushioning for the load placed upon the L-shaped support member.

8. The extender accessory as recited in claim 2, wherein the L-shaped support member further comprises:
    a) the first flat leg portion being approximately three inches in width, en eighth of an inch in thickness and twenty six inches in length; and
    b) the second flat leg portion being approximately three inches in width, an eighth of an inch in thickness and twenty six inches in length.

9. The extender accessory as recited in claim 2, wherein each metal strapping comprises a size of approximately twelve inches in length, one and a half inches in width and a eighth of an inch in thickness.

10. The extender accessory as recited in claim 2, wherein each nylon strap comprises a size of approximately ten inches in length and one inch in width.

11. The extender accessory as recited in claim 2, wherein each channel iron comprises a size of approximately one and a half inches in width, three quarters of an inch in depth, four inches in length and an eighth of an inch in thickness.

12. The extender accessory as recited in claim 5, wherein the piece of felt comprises a size of approximately six inches in width and twenty six inches in length.

13. The extender accessory as recited in claim 6, wherein each elongated adhesive felt strip comprises a size of approximately one inch in width and tour feet in length.

14. The extender accessory as recited in claim 1, wherein the spaced apart relationship of each metal strapping is of a size of approximately seven inches from center of the first flat leg portion of the L-shaped support member.

\* \* \* \* \*